Oct. 11, 1932.     H. B. BARRETT     1,882,109
BRAKE RELINING MACHINE
Filed June 19, 1930
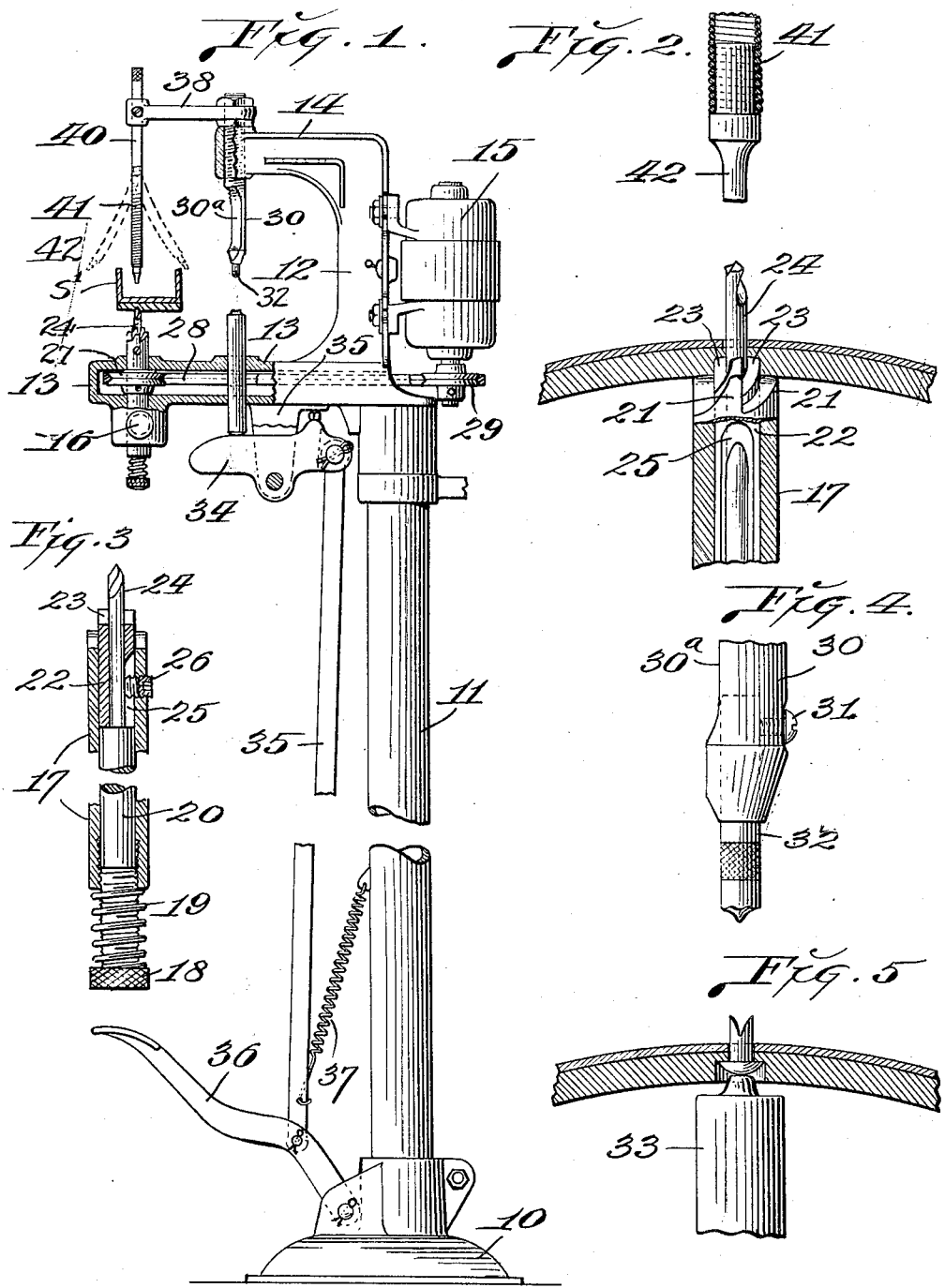
INVENTOR:—
HARRY B. BARRETT.
By Martin P. Smith Atty.

Patented Oct. 11, 1932

1,882,109

UNITED STATES PATENT OFFICE

HARRY B. BARRETT, OF LOS ANGELES, CALIFORNIA

BRAKE RELINING MACHINE

Application filed June 19, 1930. Serial No. 462,269.

This invention relates to machines and devices for performing brake relining operations.

The invention has for an object the provision of a brake relining machine which combines several operative units, to the end that separate machines for performing a relining operation are unnecessary.

Another object is the provision of a brake relining machine which is compact and in which all necessary units are closely grouped, to the end that an operator may perform a better brake relining operation and with a minimum of time and labor expended.

Another object is the provision of a brake relining machine which is so constituted and arranged as to allow for proper boring of holes or openings in the brake lining relative to the brake shoe or band.

Another object is the provision of a brake relining machine adapted to drill and countersink the brake lining, at the same time finishing the edge of the countersunk portion without leaving said edge frayed.

Another object is the provision of a brake lining machine having means for accurately determining the position of drilling and countersinking the brake lining relative to the brake shoe.

At the present time, it is an exceedingly difficult matter, say, for a skilled operator, to accurately determine the position of a hole being bored through a lining and especially a channel or U-shaped band or shoe. With my invention, however, I have provided suitable means whereby an unskilled operator may hold the lining in position relative to the channel shaped shoe and accurately determine without watching the drill or requiring special measurement, the exact position at which the hole should be bored through the lining relative to the shoe or band.

In practicing the invention, I have provided a novel form of drill, in the present instance having three portions, namely, a removable central drill, a concentric annular countersunk type drill, and a further concentric member provided with teeth having rounded heads. Thus, when lining is positioned relative to the brake band or shoe, the first drill will form the hole, the second drill will countersink around the first hole so formed, and the rounded teeth will smooth the lining at the countersunk portions. I have also combined a resiliently swingable pointer which lies in the same axis with the first drill mentioned. This swingable pointer acts separately connected with channel or U-shaped shoes to show the operator the exact position that a hole will be bored through the lining relative to the brake shoe or band. The finger member being resiliently swingable, allows the operator to force the shoe into position and out of position at will, a feature that could not be accomplished if the pointer was not so bendable and swingable. Thus, by providing a resiliently bendable and swingable pointer, it is possible to accurately and quickly position the shoe and brake lining.

The invention has for a further object, the provision of a brake relining machine which is simple in structure, inexpensive of manufacture, and generally superior.

With the above and other objects in view, the invention consists in the novel and useful provision, formation, construction, association and relative arrangement of parts, members and features, all as shown in a certain embodiment in the accompanying drawing, described generally, and more particularly pointed out in the claims.

In the drawing:

Fig. 1 is a side elevational view of a brake relining machine embodying my invention, with parts of said machine broken away and in section, Fig. 2 is a sectional view through the upper portion of the drilling, countersinking and finishing unit and through the lower end of the flexible guide or pointer for locating the position of the drill, Fig. 3 is a section taken lengthwise through the center of the combined drilling, countersinking and edge finishing unit, Fig. 4 is an elevational view of the lower end of the rivet opening member, and, Fig. 5 is an elevational view of the riveting plunger.

Referring by numerals to the accompanying drawing which illustrates a practical embodiment of my invention, 10 designates a suitable base and projecting upwardly therefrom is a post or standard 11 and secured on the upper end of said standard is a bracket 12 provided with upper and lower horizontally disposed jaws 13 and 14. Lower jaw 13 is hollow and it is somewhat longer than the upper jaw 14.

Secured on the rear portion of bracket 12 is an electric motor 15.

Arranged for rotation in the outer portion of lower jaw 13 is a vertically disposed tubular member 17, the lower portion of which is internally threaded for the reception of the threaded shank of a screw 18.

The bearing for member 17 is lubricated by means of a suitably located grease cup 16.

Interposed between the head of the screw 18 and the lower end of tubular member 17 is an expansive spring 19 which functions to retain the screw in its adjusted position and prevent accidental unscrewing of the same as a result of vibration while the machine is in operation.

Removably arranged within tubular member 17, above screw 18, is a rod 20.

The upper end of the wall of tubular member 17 is notched to form a plurality of teeth 21 and the upper ends thereof are rounded in order to make rubbing contact with the underface of the brake lining when the machine is in service, and thereby finish the edge of the countersink that is formed around the opening in said brake lining.

Removably positioned in the upper portion of tubular member 17 and resting on the upper end of rod 20 is a tubular member 22, the upper end of which is notched to form a series of countersink cutting teeth 23.

Removably positioned within the tubular member 22 and projecting beyond the teeth 23, is a drill 24, the lower end of which rests on rod 20.

The wall of tubular member 22 is cut away on one side of the lower portion to form an opening 25 that exposes the lower portion of the drill 24 and a set screw 26 passes through the upper portion of tubular member 17 and bears against that portion of the drill 24 that is exposed in opening 25. When this set screw is tightened the drill 24 and tubular member 22 are securely clamped in the upper portion of tubular member 17.

Removably mounted on the intermediate portion of tubular member 17 and within the hollow jaw 13 is a grooved pulley 27 around which passes a belt 28 and said belt engages a grooved pulley 29 that is secured on the shaft of the motor 15.

The unit assembly comprising the tubular member 17, the tubular member 22 and the drill 24 provides simple and efficient means for drilling and countersinking the brake lining and for smoothing and finishing the surface of the brake lining immediately adjacent to the edge of the countersink.

Removably seated in the outer end of jaw 14 is a vertically disposed shank 30 and removably positioned in the lower end thereof and retained by a set screw 31 is a rivet upsetting pin 32. One side of shank 30 is cut away as designated by 30ª in order to accommodate the webs and flanges of T or channel shaped brake bands or shoes.

Arranged for vertical sliding movement through jaw 13 at a point directly below shank 30 is a plunger 33, the lower end of which bears on the outer upper portion of a lever 34 and which latter is fulcrumed on a bracket 35 that projects downwardly from jaw 13.

Pivotally connected to the rear end of the lever 34 is the upper end of a rod 35 and the lower end thereof is pivotally connected to a foot lever 36 and the latter being fulcrumed on base 10.

Secured to the lower portion of rod 35 is one end of a retractile spring 37, the upper end of which is secured to standard 11 and said spring maintains lever 36 and rod 35 at their upper limits of movement, as illustrated in Fig. 1.

Detachably secured to the upper end of shank 30 is a forwardly projecting arm 38 and detachably secured to the forward end of said arm is a vertically disposed rod 40, on the lower end of which is mounted a resiliently bendable and swingable finger 41 that is formed of tightly wound spring wire.

Seated in the lower end of the resiliently bendable and swingable finger 41 is a pin 42 that occupies a position a short distance above and in direct vertical alignment with the drill 24. This flexible member 41 and pin 42 provide a finder or pointer to assist the operator in properly locating the brake band and its lining when the latter is to be drilled and countersunk and as the finger 41 is resilient, it will not only swingably bend and yield or flex when engaged by the brake band or shoe of the channel, such, for instance, the shoe S', as shown in the dotted lines in Figure 1, and is being drilled and countersunk, but also automatically through its inherent resiliency returns to its normal vertical position as indicated in full lines in Figure 1.

In the operation of my improved brake relining machine, a brake band or shoe with the lining positioned against the underface thereof is positioned directly above the drilling and countersinking unit and in order that the lining may be drilled and countersunk at the proper points or in registration with the rivet holes in the band or shoe, the brake band is positioned so that one of the rivet apertures is directly beneath the pin 41.

The brake band with its lining is now moved directly downward and the combined drill and countersinking tool will engage the lining beneath the aperture in the brake band so that drill 24 passes through the lining and through the rivet hole in the shoe and the teeth 23 on the upper end of member 22 will cut into the brake lining around the drill hole therein, thereby providing the desired countersink.

Simultaneous with this operation the rounded upper ends of the teeth 21 on member 17 will engage the outer face of the brake lining adjacent to the countersink, thereby ironing the same so as to produce a smooth finished surface and the brake band with the drilled end countersunk aperture is now withdrawn from the drill and associated parts and moved so as to bring another one of the rivet holes in the brake band into position beneath the guide finger 42 and the drilling and countersinking operations are repeated.

The tubular member 22 may be adjusted vertically in the upper end of tubular member 17 so as to regulate the depth of the countersink formed around the drill hole in the brake lining and said member 22 and the drill 24 are both firmly secured in their adjusted positions by means of set screw 26.

After the brake lining has been drilled and countersunk as just described, rivets are inserted through the drill holes in the brake lining and the registering rivet holes in the brake band with the heads of said rivets occupying the countersunk portions of the apertures in the lining, as illustrated in Fig. 5, and the brake band is now positioned so that the head of a rivet is positioned on the upper end of plunger 33.

Lever 36 is now moved downwardly, thereby actuating lever 34 so as to elevate plunger 33 and the split or tubular end of the rivet will engage the lower end of pin 32 and be upset and thereby firmly secure the brake lining to the brake band or shoe.

Thus, it will be seen that I have provided a relatively simple, practical and inexpensive machine that may be conveniently and economically employed for the comparatively rapid drilling, countersinking and riveting operations incident to the securing of linings to brake bands and shoes.

The resilient guide or finger 41 is of extreme importance. Take for illustration Figures 1 and 2 and prior to an actual boring operation. The operator would hold the brake lining relative to the band and so that the marginal edges thereof would parallel. It is necessary if the band already has openings therein, previously made and from which the old rivets have been removed, to again use the same openings in the band. The proper positioning of the drill to make an opening in the brake lining would be especially difficult with channel shaped shoes, were it not for the resilient pointer 41. An operator only need lower the resilient pointer to a position directly above the band so that the pointer portion 42 would overlie the opening in the band, whereupon the drilling operation would occur and the drill would come through the opening in said band. If the finger was not present, it will be readily appreciated how difficult it would be to drill through the lining blindly and trust upon finding the opening in the band. On the other hand, the drilling might be done in a reverse order but this is sometimes difficult of accomplishment, because the operator would have to stoop and look up under and at the band to see that the drill was entering the opening already formed in the band. In the case of the ordinary type of segmental brake shoes which are universally used in motor vehicles at the present time, the difficulty of finding the opening in the brake shoe is greatly enhanced. Consequently, relining of brake shoes is an expensive matter. With this invention, however, the tip 42 of the resilient finger 41 will point to the opening in the brake shoe and the operator only needs to hold the lining in position and apply the power to rotate the drill to be assured that the drill will come through an opening already formed in the shoe, the finger 41 automatically, as I have described, and without other manipulation, permitting proper placement of the shoe and then taking its normal pointing position within the channel of the shoe. Quite obviously, it is essential to provide numerous openings in the lining in order that it may be properly riveted to the shoe and the pointer 41, due to its resiliently bendable and swingable properties, readily permits the shoe to be moved to different positions in order that the lining may be bored. It is evident that, were the pointer 41 rigid, it would be necessary to elevate and then lower the pointer at each drilling insertion of the shoe, all such manipulations being, however, totally eliminated in the use and operation of the present bendable and swingable and yet resilient pointer 41. If the pointer was not resilient but relatively stiff, it would be necessary to lift the pointer upwardly and allow it to drop downwardly at each operation.

It is obvious that various changes and modifications and variations may be made in practicing the invention in departure from the particular showing of the drawing without departing from the true spirit of the invention, as defined by the scope of the appended claims.

I claim as my invention:

1. In a brake relining machine, in combination with a drilling tool, a finger depending in spaced axial aligning registration with the tool, and a pointer tip carried axially by said finger, the finger being constructed of coiled wire and being readily bendable and swingable relatively to the tool and resilient to return to the axial aligning registration.

2. In a brake relining machine, a combination with a drilling tool, of a rod disposed in spaced axial aligning registration with the tool, a finger constructed of a tightly coiled wire carried by and depending from the rod, and a pointer tip carried at the free end of said finger and normally disposed in spaced axial alignment with the tool.

In testimony whereof I affix my signature.

HARRY B. BARRETT.